United States Patent
Casado-Montero et al.

(10) Patent No.: US 11,555,448 B2
(45) Date of Patent: Jan. 17, 2023

(54) AIR INTAKE SYSTEM

(71) Applicant: Airbus Operations S.L., Getafe (ES)

(72) Inventors: Carlos Casado-Montero, Getafe (ES); Pio Fernandez-Lopez, Getafe (ES)

(73) Assignee: Airbus Operations S.L., Getafe (ES)

( * ) Notice: Subject to any disclaimer, the term of this patent is extended or adjusted under 35 U.S.C. 154(b) by 800 days.

(21) Appl. No.: 16/440,301

(22) Filed: Jun. 13, 2019

(65) Prior Publication Data

US 2019/0390601 A1    Dec. 26, 2019

(30) Foreign Application Priority Data

Jun. 22, 2018 (EP) .................................. 18382461

(51) Int. Cl.
| | | |
|---|---|---|
| *F02C 7/057* | (2006.01) | |
| *B64D 13/02* | (2006.01) | |
| *B64D 33/02* | (2006.01) | |
| *B64D 13/06* | (2006.01) | |

(52) U.S. Cl.
CPC ............. *F02C 7/057* (2013.01); *B64D 13/02* (2013.01); *B64D 33/02* (2013.01); *B64D 2013/0611* (2013.01); *B64D 2033/0213* (2013.01)

(58) Field of Classification Search
CPC ............ B64D 2013/0611; B64D 33/02; B64D 2033/0213; F02C 7/04
USPC ...................................... 244/53 B
See application file for complete search history.

(56) References Cited

U.S. PATENT DOCUMENTS

| | | | | |
|---|---|---|---|---|
| 2,997,257 | A * | 8/1961 | Thomas ............... | B64C 29/0058 244/53 B |
| 3,099,423 | A | 7/1963 | Wilde et al. | |
| 4,174,083 | A * | 11/1979 | Mohn .................... | B64D 33/02 137/15.1 |
| 4,418,879 | A * | 12/1983 | Vanderleest .......... | B64D 33/02 137/15.1 |
| 4,655,413 | A | 4/1987 | Genssler et al. | |
| 4,836,473 | A * | 6/1989 | Aulehla ................. | B64C 21/00 244/130 |

(Continued)

FOREIGN PATENT DOCUMENTS

| | | |
|---|---|---|
| EP | 2829475 A1 | 1/2015 |
| GB | 2155413 A | 9/1985 |
| GB | 2176570 A | 12/1986 |

OTHER PUBLICATIONS

European Search Report; priority document.

*Primary Examiner* — Christopher P Ellis
(74) *Attorney, Agent, or Firm* — Greer, Burns & Crain, Ltd.

(57) ABSTRACT

An air intake system comprising an air duct suitable for providing airflow to the inside of an aircraft, preferably to an auxiliary power unit; an inlet arranged at one end of the air duct; a skin surrounding the inlet; a plurality of slots arranged on the skin; a driving arrangement, a flap door connected to the driving arrangement, and a plurality of fins connected to the driving means. The driving arrangement is configured for moving the flap door between at least two positions, the positions being a closed position wherein the flap door closes the inlet, and an opened position wherein the flap door is driven away from the closed position. The driving arrangement is also configured for moving the plurality of fins such that the plurality of fins protrudes through the slots.

16 Claims, 5 Drawing Sheets

(56) References Cited

U.S. PATENT DOCUMENTS

| | | | | |
|---|---|---|---|---|
| 6,247,668 B1* | 6/2001 | Reysa | ............... | B64D 41/00 244/54 |
| 6,264,137 B1* | 7/2001 | Sheoran | ............... | B64D 41/00 55/306 |
| 6,349,899 B1* | 2/2002 | Ralston | ............... | B64D 33/02 244/53 B |
| 7,222,819 B1* | 5/2007 | Kelnhofer | ............... | B64D 13/00 244/53 B |
| 7,344,107 B2* | 3/2008 | Campbell | ............... | F02C 7/04 244/58 |
| 8,141,818 B2* | 3/2012 | Bouldin | ............... | B64D 41/00 244/53 B |
| 9,254,925 B2 | 2/2016 | Garcia Nevado | ............... | B64D 41/00 |
| 10,279,920 B1* | 5/2019 | Farrell | ............... | B64D 33/02 |
| 10,974,817 B2* | 4/2021 | Heuer | ............... | B64C 21/08 |
| 10,989,071 B2* | 4/2021 | Walsh | ............... | B64D 33/08 |
| 2007/0246607 A1* | 10/2007 | Sheoran | ............... | B64D 41/00 244/129.4 |
| 2009/0065297 A1* | 3/2009 | Hein | ............... | F02C 7/045 181/259 |
| 2011/0001019 A1* | 1/2011 | Bouldin | ............... | B64D 41/00 244/53 B |
| 2012/0292455 A1* | 11/2012 | DeDe | ............... | B26F 3/004 244/53 B |
| 2013/0037122 A1* | 2/2013 | Nager | ............... | B64D 41/00 137/15.1 |
| 2013/0081706 A1* | 4/2013 | Garcia Nevado | ............... | B64D 41/00 137/15.1 |
| 2015/0031276 A1* | 1/2015 | Tretow | ............... | F02C 7/042 454/151 |
| 2015/0060593 A1 | 3/2015 | Prince et al. | | |
| 2015/0115099 A1* | 4/2015 | Payangapadan | ............... | B64C 1/0009 137/15.1 |
| 2016/0075442 A1* | 3/2016 | Ahmad | ............... | F02C 7/32 244/58 |
| 2016/0264251 A1* | 9/2016 | Bell | ............... | F02C 7/045 |
| 2017/0190439 A1 | 7/2017 | Tretow et al. | | |
| 2018/0093779 A1* | 4/2018 | Ainslie | ............... | B64D 41/00 |
| 2018/0208323 A1* | 7/2018 | Parsons | ............... | B64D 33/02 |
| 2018/0257788 A1* | 9/2018 | Liu | ............... | B64C 5/02 |
| 2020/0284192 A1* | 9/2020 | Haynes | ............... | B64C 29/0033 |
| 2021/0215097 A1* | 7/2021 | Gons | ............... | F02C 7/055 |
| 2021/0332996 A1* | 10/2021 | Bender | ............... | F24F 11/77 |

\* cited by examiner

AIR INTAKE SYSTEM

CROSS-REFERENCES TO RELATED APPLICATIONS

This application claims the benefit of the European patent application No. 18382461.4 filed on Jun. 22, 2018, the entire disclosures of which are incorporated herein by way of reference.

FIELD OF THE INVENTION

The present invention belongs to the field of air intake systems and relates to an air intake system with vortex generating capabilities for providing airflow to the inside of an aircraft.

BACKGROUND OF THE INVENTION

In the aircraft industry, air intake systems are installed in parts of the aircraft that need air supply for feeding a number or systems, like the auxiliary power unit.

Normally, the air intake systems are positioned as close to the systems they feed as possible, for example at the tail of the aircraft in the case of the auxiliary power unit. As a consequence, the inlet of the air intake systems can be shadowed by other aircraft parts like the wing, the engines, or the fuselage itself. Furthermore, they operate often under adverse pressure gradients for the intake of air, which may result in the reverse of the flow of the stream of air in different areas of the ducts. Therefore, the process of drawing air from the surrounding stream is carried out under unfavorable conditions that needs solutions to increase the efficiency of air ingestion.

In order to redirect and convey the stream of air directly into the ducts, some aircraft have implemented different solutions such as doors in the fuselage that open when the intake of air is needed. Another solution is installing scoops that extend from the aircraft surface and keep interfering with the air stream for the entire aircraft performance.

However, these solutions present some disadvantages. First, the presence of bodies in the stream of air increases aerodynamic drag. Also, as it is well known in the field of aerodynamics, the extent of separation of the boundary layer of the air stream depends on the flying conditions. Generally, when the speed of the aircraft increases, the boundary layer separates from certain curved aircraft surfaces and turns turbulent. As a consequence, the boundary layer in the ducts tends to turn turbulent and separate, thus creating areas where the effectiveness effectiveness of the intake is greatly reduced, an effect that reduces the overall air intake effectiveness effectiveness.

As a result, the effectiveness of the intake of air is greatly reduced depending on the flight conditions.

One solution developed in order to minimize the problems derived from the boundary layer separation phenomenon is the implementation of vortex generators before (upstream of) the inlet. Vortex generators are known and commonly used in the architecture of aerodynamic surfaces meant to fly at high Mach numbers. They are usually installed before control surfaces like spoilers or ailerons in order to increase their efficiency, reducing the amount of separated boundary layer of the air stream.

Vortex generators energize the air stream, generating micro turbulences in the boundary layer, which makes the boundary layer less prone to separate, thus helping to delay the separation.

However, the presence of the vortex generators in every stage of the flight is not always recommended. At low Mach numbers, where the boundary layer tends to remain laminar and adhered, and, therefore, does not need of any auxiliary element, the vortex generator's only contribution is increasing aerodynamic drag, thus increasing the fuel consumption while providing the aircraft performance with no positive effects at all.

SUMMARY OF THE INVENTION

In a first inventive aspect, the invention provides an air intake system for an aircraft, the air intake system comprising:

an air duct suitable for providing airflow to the inside of an aircraft, preferably to an auxiliary power unit,
an inlet arranged at one end of the air duct,
a skin surrounding the inlet,
a plurality of slots arranged on the skin,
a driving means,
a flap door connected to the driving means, and
a plurality of fins connected to the driving means,
wherein the driving means is configured for moving the flap door between at least two positions, the positions being a closed position wherein the flap door closes the inlet, and an opened position wherein the flap door is driven away from the closed position, and wherein the driving means is also configured for moving the plurality of fins such that the plurality of fins protrudes through the slots.

The air intake system is adapted to be installed on an aircraft. The skin is a structural element of the air intake system, along with the flap door and the plurality of fins, which will be exposed to the surrounding air, that is, outside of the aircraft, but the skin is the element which defines the boundary with the external surface of the aircraft. Therefore, when the air intake system is installed on an aircraft, the skin of the air intake system and the external surface of the aircraft forms an aerodynamic surface continuity which limits the inside and outside of the aircraft.

Advantageously, once the air intake system is installed on the aircraft, the structural connection between the external surface of the aircraft and the skin of the air intake system does not contribute to increase drag.

Also advantageously, the rest of the elements of the air intake system exposed to the surrounding air, that is, the flap door, and the plurality of fins, are configured to provide structural aerodynamic continuity with the external surface of the aircraft when the plurality of fins is in a non-operative position, thus not generating unwanted drag.

For air ingestion per se, the air intake system comprises an inlet. In a preferred embodiment, the inlet is a NACA inlet. In the aircraft industry, NACA inlets are commonly regarded as inlets with low-drag design airfoils.

The air intake system further comprises a flap door configured to open, driven by the driving means, the inlet for the taking of air when airflow is needed by a system of the aircraft like, for example, the auxiliary power unit (APU).

The skin of the present air intake system comprises a plurality of slots arranged therein. The plurality of slots is further configured to let a plurality of fins protrude through it. That is, when the air intake system is installed on an aircraft, the fins are configured to protrude through the slots towards the outside of the aircraft when vortex generation in the boundary layer of the surrounding airflow is needed. In a preferred embodiment, the plurality of slots and the plurality of fins are shaped in a way that, when the plurality of fins is in a non-operative position, such fins are completely retracted under the skin, that is, inside the aircraft. In this non-operative position, the plurality of fins caps the plurality of slots, without protruding above the skin, in such a way that that skin provides a structural aerodynamic continuity. Through this document, the expression "under the skin" or "towards under the skin" it will be understood as the place or region wherein the air duct is located. as Also, the expression "above the skin" or "towards above the skin" will be understood as the place or region that is out of the air duct or towards outside the inlet or the air duct. That is, when the air intake system is installed on an aircraft, the expression "under the skin" will correspond to the inside of the aircraft, and the expression "above the skin" will correspond to the outside of the aircraft.

In an operative position, the plurality of fins protrudes through the plurality of slots by the actuation of the driving means.

The operation scheme of the air intake system when it is configured to feed, for example, the Auxiliary Power Unit (APU), regards the following scenarios depending on the flight conditions:

the APU does not need a supply of air and the flap door and the plurality of fins remain in a closed position and a retracted position, respectively, the APU needs a supply of air and the driving means drive the flap door opening the inlet, while the plurality of fins is retracted under the skin, thus allowing the ingest of airflow from the surrounding air towards inside the air duct, the flap door is opened and the boundary layer of the air stream separates when entering through the inlet and the driving means make the plurality of fins protrude through the plurality of slots.

The present invention provides an improved air intake system compared with the air intakes of the prior art. That is, the present invention provides an air intake system that advantageously can control, depending on the flight conditions, when to trigger auxiliary elements that help to delay the separation of the boundary layer in order to improve the air ingest efficiency of inlets without provoking an unnecessary increase of drag when no vortex generation is needed.

In a particular embodiment, the air intake system comprises a plurality of slots arranged on a surface of the air duct, and a plurality of fins connected to the driving means is configured to protrude towards inside the air duct through the plurality of slots arranged on the surface of the air duct.

In this particular embodiment, the control exerted by the fins in the boundary layer of the air stream conveyed towards the inlet due to vortex generation is implemented also in the airflow that is already inside the duct. This is, to delay potential airflow separation inside the ducts and keep the boundary layer attached to the internal surfaces of the ducts, the plurality of fins further protrude inside the duct through the plurality of slots arranged in a surface of the duct. Advantageously, potential areas where the airflow separation reduces the effective intake area are prevented.

In a particular embodiment, the air intake system comprises a first hinge shaft connected to the flap door in one end of the first hinge shaft by a joint point, and a second hinge shaft connected to the plurality of fins in one end of the second hinge shaft by a joint point.

In order to be easily and reliably moved by the driving means, the flap door and the plurality of fins are each connected to a first and second hinge shaft, respectively, by one end of the hinge shafts.

In a particular embodiment, the driving means comprises a first actuator and an articulating mechanism, the articulating mechanism being connected to the first and second hinge shaft in such a way that the first and second hinge shaft are configured to be actuated conjointly by the first actuator.

This configuration provides the air intake system with the capacity of being fully operated when the driving means actuate just on one hinge shaft. The articulating mechanism transmits the movement between both hinge shafts, and, consequently, between the flap door and the plurality of fins, making them to work conjointly.

Advantageously, when the driving means comprises a single actuator, both the flap door and the plurality of fins can be driven synchronously.

In a particular embodiment, the articulating mechanism comprises a connecting rod articulately connected to the first and second hinge shaft in a first and second joint point of the connecting rod, respectively.

In a particular embodiment, the first actuator is connected to the first hinge shaft.

In a particular embodiment, the first actuator is connected to the second hinge shaft.

In a particular embodiment, the driving means comprises a first actuator connected to the first hinge shaft and a second actuator connected to the second hinge shaft.

In a particular embodiment, the second actuator is an electrical actuator, a pneumatic actuator, or any combination of the above.

In a particular embodiment, the first actuator is an electrical or a pneumatic actuator, or any combination of the above.

In a particular embodiment, the flap door comprises a first and a second panel. Some known air intake systems are provided with a single flap door which opens the inlet when air ingestion is needed. According to this particular embodiment of the present invention, the flap door is split into a first and a second panel. Advantageously, with an air intake system according to this two-panel configuration, it is possible to improve control of the air intake with a smaller drag caused by the interference of the flap door in comparison with single flap door systems.

The first panel will be regarded as the panel positioned further from the plurality of fins. The first panel opens towards the outside of the air duct, interfering with the surrounding air, the panel being shorter than a single panel configuration and thus generating less drag. The second panel is positioned closer to the plurality of fins and is configured to move towards the inside of the inlet, creating a slope that lets the airflow go through the inlet inside the duct.

In a particular embodiment, the first panel is connected to the first hinge shaft and the second panel is connected to the second hinge shaft.

In a particular embodiment, the first and the second panel are configured to be moved independently of each other. Having a two-panel configuration, each moving independently from the other, provides the air intake system with a further degree of freedom in order to improve control of the intake area. Advantageously, the air intake system according to this particular embodiment is configured to operate in the following scenarios depending on the airflow intake requirements:

both panels remain closed, the first panel opens towards the outside of the duct, while the second panel remains closed, the first panel remains closed, while the second panel opens towards the inside of the duct, both panels open.

As can be seen, these possible operative configurations provide the air intake system, according to this particular embodiment, with a wide range of airflow intake areas.

In a particular embodiment, the driving means are configured to control an angle that is formed by the flap door relative to a closed position of the flap door. Advantageously, the driving means can drive the flap door in such a way that permits adjusting the flap door to a certain opening angle. Thus, this action allows selecting an optimum angle of attack depending on the flight conditions. These conditions will determine the airflow intake requirements, allowing the air intake system to minimize the drag generated by interposing the flap door in the surrounding air stream under the optimum angle of attack.

In a second inventive aspect, the invention provides an aircraft comprising the air intake system according to any of the embodiments of the first inventive aspect.

All the features described in this specification (including the claims, description and drawings) can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

Figure 1:
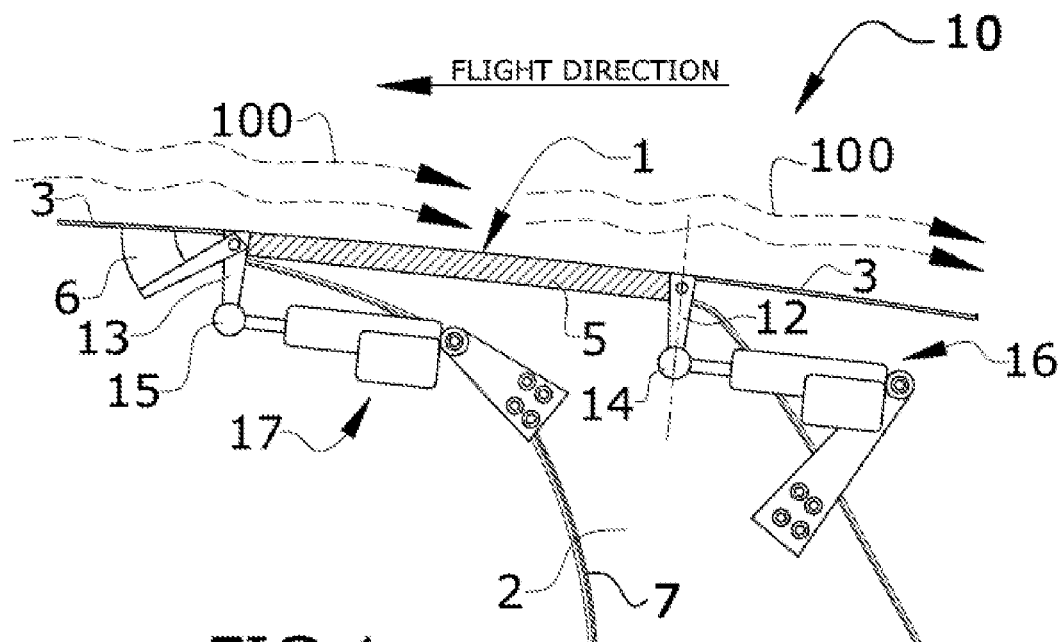
FIG. 1 shows a schematic cross-sectional view of an air intake system according to an embodiment of the present invention.

FIGS. 1-8 and 10 show a schematic cross-section view of air intake systems (10) that can be installed in an aircraft (18) for supplying incoming airflow (100) to the inside of the aircraft. When the aircraft (18)(FIG. 9) is in flight, airflow (100) is generated around the external surface of the aircraft. In flight, when the air intake system (10) does not provide airflow (100) to inside the aircraft, this airflow (100) will be understood as an external airflow having a direction opposite to the flight direction of the aircraft. Further, when the air intake system (10) provides airflow (100) to inside the aircraft, this airflow (100) will be understood as an incoming airflow. It will be understood that when the present air intake system (10) is installed on an aircraft, the skin (3) of such air intake system (10) and the external surface of the aircraft forms a continuous surface.

Figure 2:
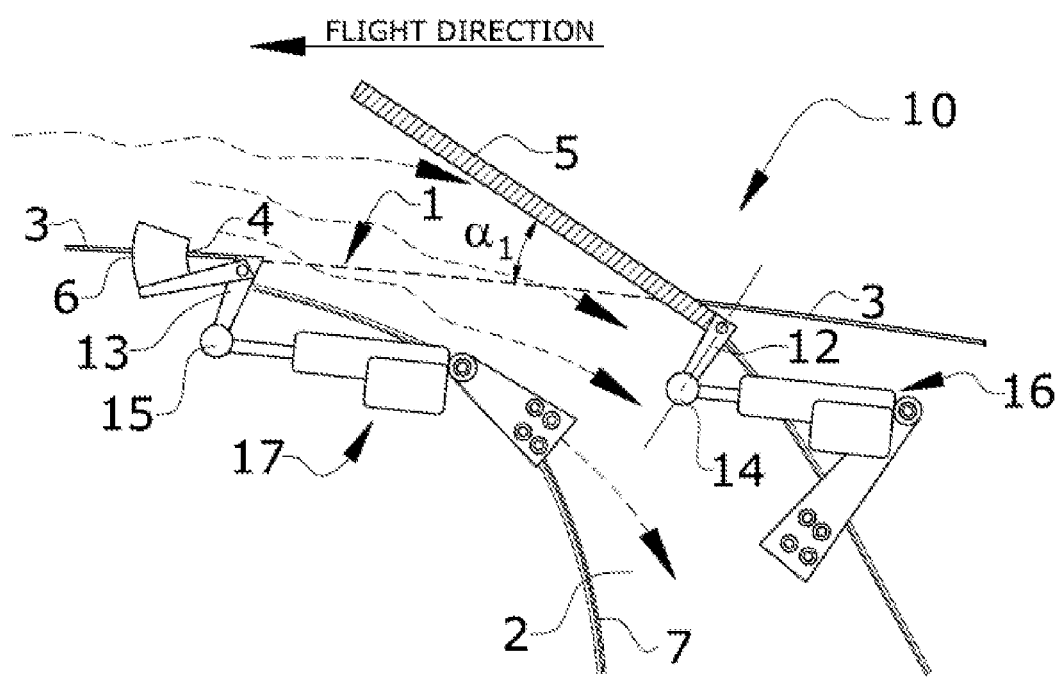
FIG. 2 shows a schematic cross-sectional view of an air intake system according to the embodiment of FIG. 1.

FIGS. 1-2 show a first exemplary embodiment of the air intake system (10). This air intake system (10) is suitable for providing airflow (100) through an air duct (2) inside of the aircraft (18). In this particular embodiment, the air intake system (10) provides airflow (100) to an auxiliary power unit (APU).

The air intake system (10) shown in these figures comprises an inlet (1) arranged at one end of the air duct (2), a skin (3) surrounding the inlet (1), a plurality of slots (4) arranged on the skin (3), a flap door (5) and a plurality of fins (6).

In this first embodiment, the flap door (5) is understood as a single panel which can be moved between at least two positions by a driving means: a closed position, wherein the flap door (5) closes the inlet (1), and an opened position wherein the flap door (5) is driven away from the closed position.

The driving means comprises a first actuator (16) and a second actuator (17) configured to actuate independently of each other.

The first actuator (16) is connected to a first hinge shaft (12) by a first joint point (14). The first hinge shaft (12) is further connected to the flap door (5). The first actuator (16) is configured to actuate on the first hinge shaft (12) for hingedly moving the flap door (5).

The second actuator (17) is connected to a second hinge shaft (13) by a second joint point (15). The second hinge shaft (13) is further connected to the plurality of fins (6). The second actuator (17) is configured to actuate on the second hinge shaft (13) for making the plurality of fins (6) protrude through the plurality of slots (4).

FIG. 1 shows a non-operative position of the air intake system (10) according to the first embodiment. In this non-operative position, the flap door (5) is in the closed position, preventing the external airflow (100) from going through the inlet (1) towards the interior of the air duct (2). In addition, the second actuator (17) keeps the plurality of fins (6) retracted inside the aircraft (18).

FIG. 2 shows an operative position of the air intake system (10) according to the first embodiment. In this operative position, the flap door (5) is opened towards the outside of the air duct (2) forming a first angle (a1) with respect to the closed position. The closed position of the flap door (5) is represented in FIG. 2 with a dashed line in order to better identify the first angle (a1). Further, the plurality of fins (6) is protruded through the plurality of slots (4) by the actuation of the second actuator (17). In this operative position, the opened position of the flap door (5) allows the airflow (100) to go inside the air duct (2), and the incoming airflow (100) remains adhered to the surface (2.1) of the air duct (2) by the vortex generated by the protrusion of the plurality of fins (6) through the plurality of slots (4).

Figure 3:
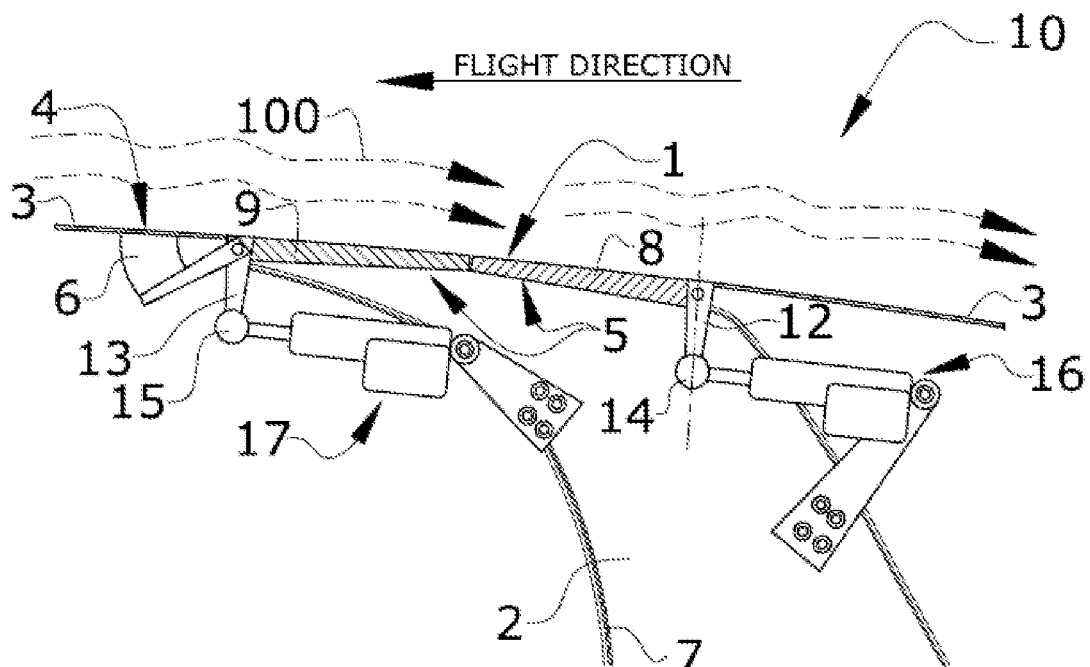
FIG. 3 shows a schematic cross-sectional view of an air intake system according to an embodiment of the present invention.
Figure 4:
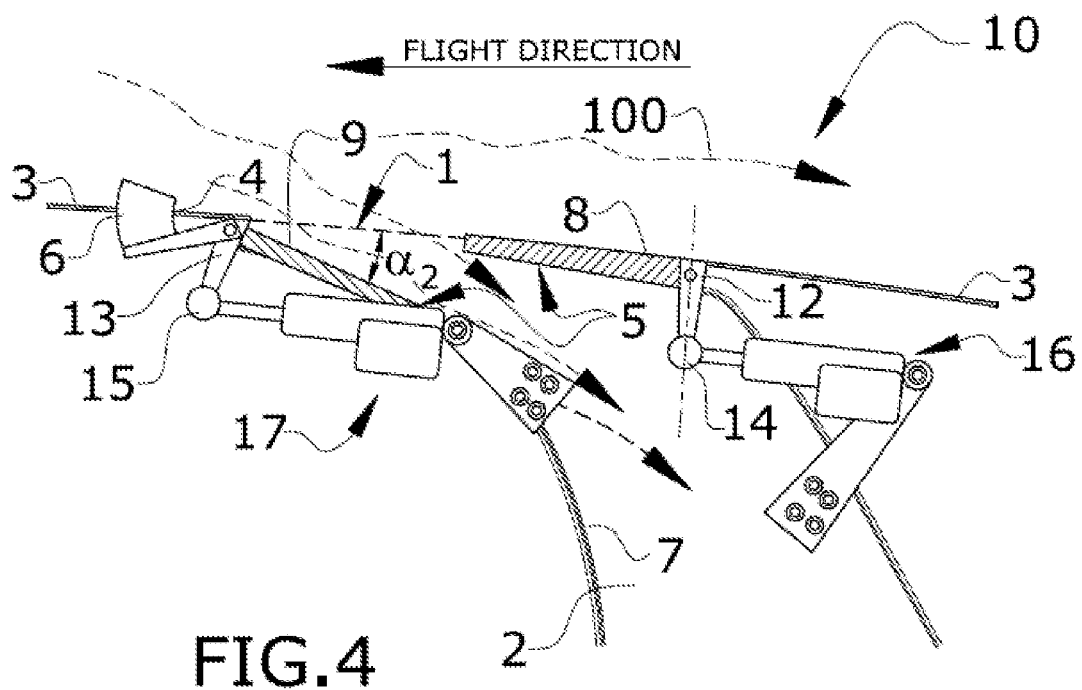
FIG. 4 shows a schematic cross-sectional view of an air intake system according to the embodiment of FIG. 3.
Figure 5:
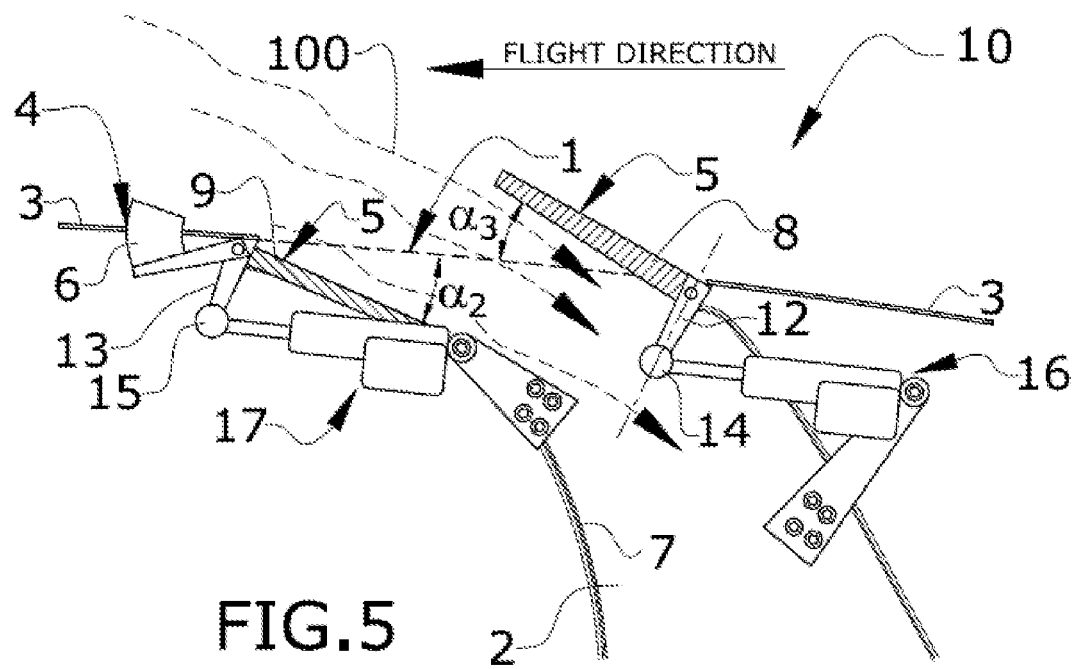
FIG. 5 shows a schematic cross-sectional view of an air intake system according to the embodiment of FIGS. 3-4.

FIGS. 3-5 show a second exemplary embodiment of the air intake system (10) according to the invention. This air intake system (10) is suitable for providing airflow (100) through an air duct (2) inside of the aircraft (18). In this second embodiment, the air intake system (10) provides airflow (100) to an APU.

The air intake system (10) shown in these figures comprises an inlet (1) arranged at one end of the air duct (2), a skin (3) surrounding the inlet (1), a plurality of slots (4) arranged on the skin (3), a flap door (5) and a plurality of fins (6).

In this second embodiment, the flap door (5) comprises a first (8) and a second (9) panel. Both panels (8, 9) can be moved between at least two positions by a driving means: a closed position, wherein at least one of the panels (8, 9) of the flap door (5) closes the inlet (1), and an opened position wherein at least one of the panels (8, 9) of the flap door (5) is driven away from the closed position.

In this embodiment the driving means comprises a first actuator (16) and a second actuator (17) configured to actuate independently of each other.

The first actuator (16) is connected to a first hinge shaft (12) by a first joint point (14). The first hinge shaft (12) is further connected to the first panel (8). The first actuator (16) is configured to actuate on the first hinge shaft (12) for hingedly moving the first panel (8) of the flap door (5).

The second actuator (17) is connected to a second hinge shaft (13) by a second joint point (15). The second hinge shaft (13) is further connected to the second panel (9) and to the plurality of fins (6). The second actuator (17) is configured to actuate on the second hinge shaft (13) for making the plurality of fins (6) protrude through the plurality of slots (4) as well as for hingedly moving the second panel (9) of the flap door (5).

FIG. 3 shows a non-operative position of the air intake system (10) according to the second embodiment. In this non-operative position, the flap door (5) is in the closed position, that is, both panels (8, 9) are in the closed position, preventing the external airflow (100) from going through the inlet (1) towards the interior of the air duct (2). In addition, the second actuator (17) keeps the plurality of fins (6) retracted inside the aircraft (18).

FIG. 4 shows an operative position of the air intake system (10) according to the second embodiment. In this operative position, the flap door (5) is partially opened, that is, the first panel (8) is in the closed position and the second panel (9) is opened towards the inside of the air duct (2) forming a second angle ($\alpha 2$) with respect to the closed position. The closed position of the second panel (9) of the flap door (5) is represented in FIG. 4 with a dashed line in order to better identify the second angle ($\alpha 2$). In this embodiment, the first actuator (16) keeps the first panel (8) in the closed position. Further, the plurality of fins (6) is protruded through the plurality of slots (4) by the actuation of the second actuator (17). In this operative position, the partially opened position of the flap door (5) allows the airflow (100) to go inside the air duct (2), and the incoming airflow (100) remains adhered to the surface (7) of the air duct (2) by the vortex generation generated by the protrusion of the plurality of fins (6) through the plurality of slots (4).

FIG. 5 shows another operative position of the air intake system (10) according to the second embodiment. In this operative position, the flap door (5) is opened, that is, the first panel (8) is opened towards outside the air duct (2) forming a third angle ($\alpha 3$) with respect to the closed position and the second panel (9) is opened towards inside of the air duct (2) forming a second angle ($\alpha 2$) with respect to the closed position. The closed position of both panels (8, 9) of the flap door (5) is represented in FIG. 5 with a dashed line in order to better identify the second and third angles ($\alpha 2$, $\alpha 3$). In this figure, the driving means keeps both panels (8, 9) in the opened position. Further, the plurality of fins (6) is protruded through the plurality of slots (4) by the actuation of the second actuator (17). In this operative position, the opened position of the panels (8, 9) as described above, allows the airflow (100) to go inside the air duct (2), and the incoming airflow (100) remains adhered to the surface (7) of the air duct (2) by the vortex generated by the protrusion of the plurality of fins (6) through the plurality of slots (4).

The amount of incoming airflow (100) in the operative position of the air intake system (10) shown in FIG. 5 is greater than in the operative position shown in FIG. 4.

Figure 6:
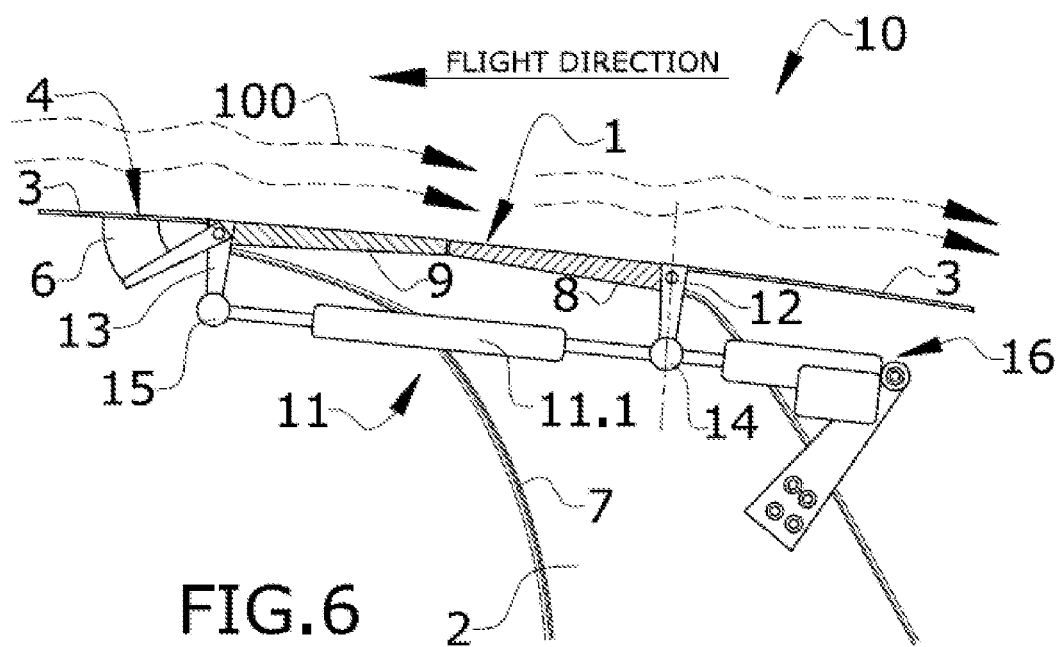
FIG. 6 shows a schematic cross-sectional view of an air intake system according to an embodiment of the present invention.
Figure 7:
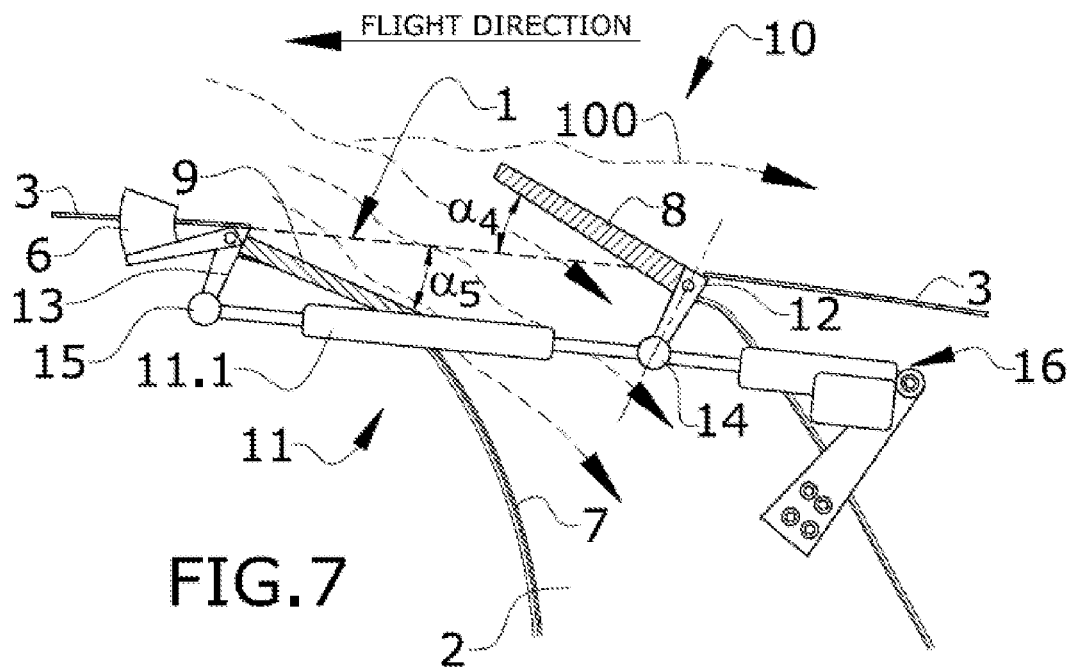
FIG. 7 shows a schematic cross-sectional view of an air intake system according to the embodiment of FIG. 6.

FIGS. 6-7 show a third exemplary embodiment of the air intake system (10). In this particular embodiment, the air intake system shown in the figures comprises an inlet (1) arranged at one end of the air duct (2), a skin (3) surrounding the inlet (1), a plurality of slots (4) arranged on the skin (3), a flap door (5) and a plurality of fins (6).

In this third embodiment, the flap door (5) comprises a first (8) and a second (9) panel. Both panels (8, 9) can be moved between at least two positions by a driving means: a closed position, wherein both panels (8, 9) close the inlet (1), and an opened position wherein the first panel (8) is opened towards the outside of the air duct (2) and second panel (9) is opened towards the inside of the air duct (2), The driving means comprise a first actuator (16) and an articulating mechanism (11) connected to a first (12) and a second (13) hinge shaft. The first actuator (16) is connected to the first hinge shaft (12) by a first joint point (14). The first hinge shaft (12) is further connected to the first panel (8). The first actuator (16) is configured to actuate on the first hinge shaft (12) for hingedly moving the first panel (8).

The articulating mechanism (11) comprises a connecting rod (11.1) and is responsible for transmitting the movement between the first (12) and second (13) hinge shaft, thus making the first (8) and second (9) panels move conjointly. Further, the connecting rod (11.1) is also responsible for transmitting the movement to the plurality of fins (6), thus making the plurality of fins (6) be protruded through the plurality of slots (4) or be retracted.

FIG. 6 shows a non-operative position of the air intake system (10) according to the third embodiment. In this non-operative position, the first (8) and second (9) panels are in the closed position, preventing the airflow (100) from going through the inlet (1) towards the inside of the air duct (2). In addition, as the movement of the plurality of fins (6) is linked to the movement of the first (8) and second (9) panels by means of the articulating mechanism (11), the plurality of fins (6) is retracted inside the aircraft (18).

FIG. 7 shows an operative position of the air intake system (10) according to the third embodiment. In this operative position, the first (8) and second (9) panels are opened. According to this embodiment, the first panel (8) is opened towards the outside of the air duct (2) forming a fourth angle ($\alpha 4$) with respect to the closed position. Also, the second panel (9) is opened towards inside of the air duct (2) forming a fifth angle ($\alpha 5$) with respect to the closed position. The closed position of both first (8) and second (9) panels is represented in FIG. 7 with a dashed line in order to better identify the fourth and fifth angles ($\alpha 4$, $\alpha 5$). The plurality of fins (6) protrudes through the plurality of slots (4) by the actuation of the first actuator (16) transmitted by means of the articulating mechanism (11) between the first (12) and second (13) hinge shafts.

Figure 10:
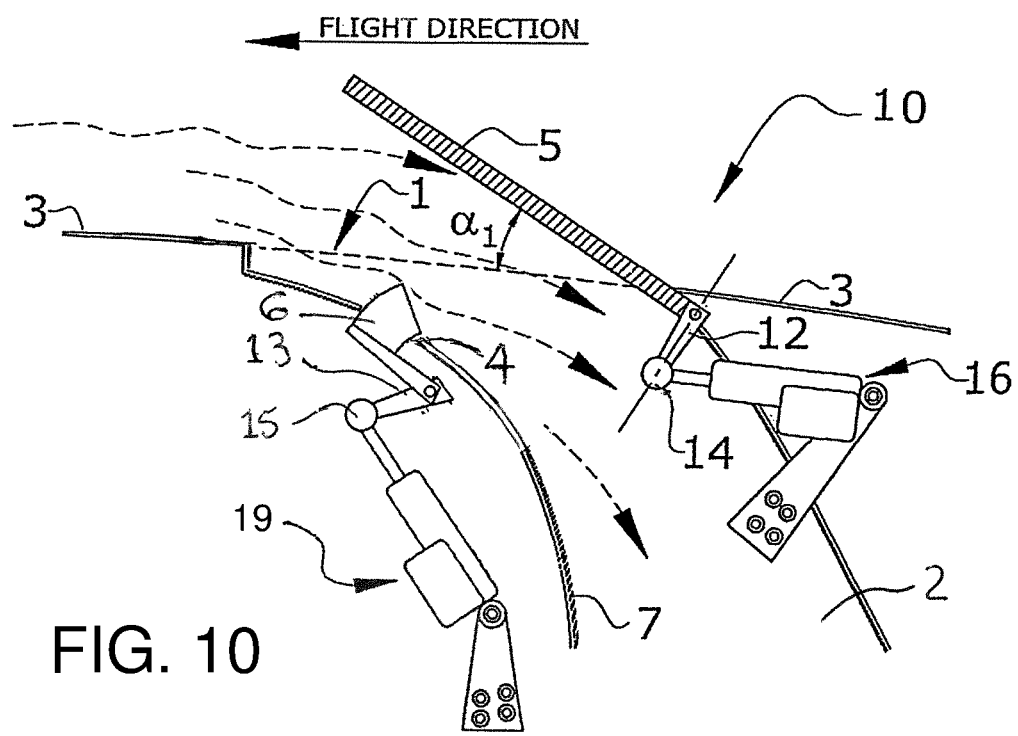
FIG. 10 shows a schematic cross-sectional view of an air intake system according to an embodiment of the present invention.

In a fourth embodiment shown in FIG. 10, the air intake system (10) according to any of the previous embodiments further comprises a plurality of slots (4) arranged on a surface (7) of the air duct (2) and a plurality of fins (6) connected to the driving means (19). The fins (6) are configured to protrude towards inside the air duct (2) through the plurality of slots arranged on the surface (7) of such air duct (2).

Figure 8:
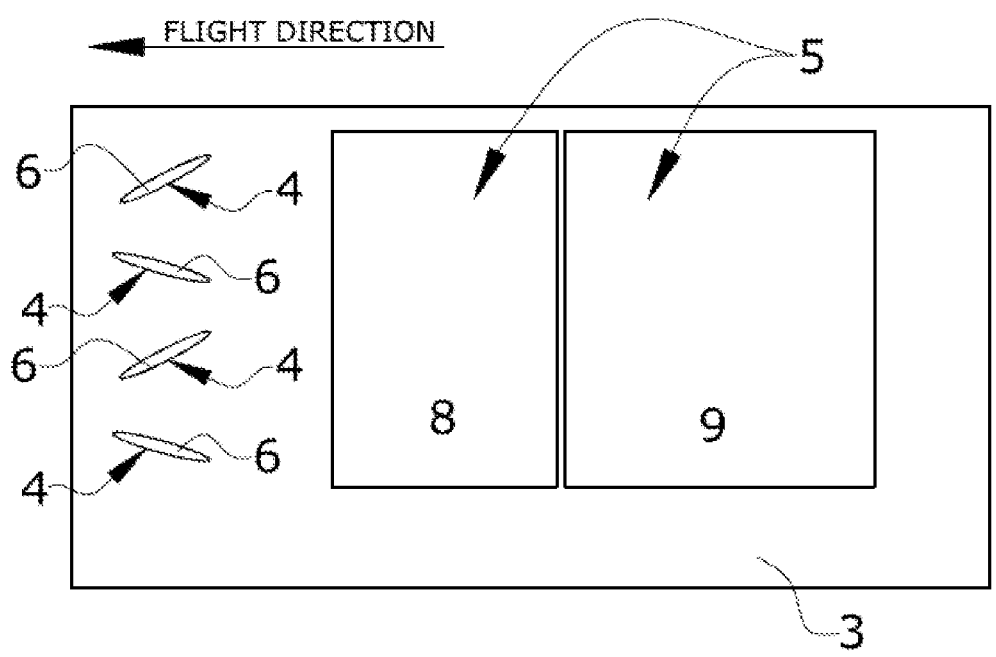
FIG. 8 shows a schematic top view of an air intake system according to an embodiment of the present invention.

FIG. 8 shows a top view of the air intake system (10) according to the second or third embodiments described above. As can be seen, the first (8) and second (9) panels of the flap door (5) are closed, in a non-operative position. The plurality of fins (6) is retracted inside the aircraft (18) through the plurality of slots (4) arranged in the skin (3).

Figure 9:
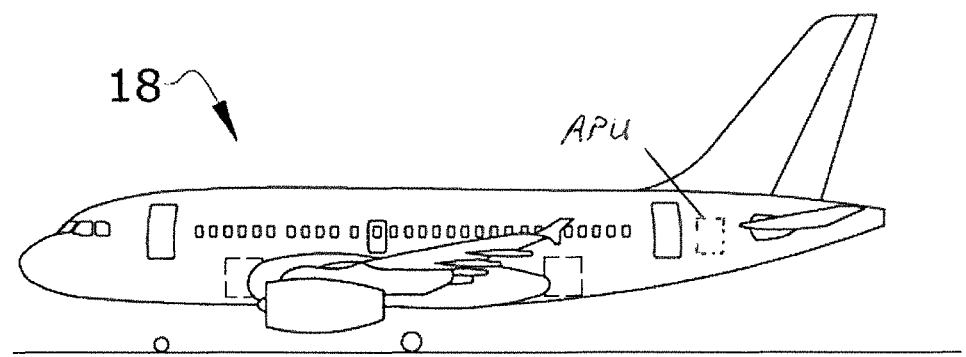
FIG. 9 shows an aircraft comprising an air intake system according to an embodiment of the present invention.

FIG. 9 shows an aircraft (18) comprising an air intake system (10) as shown in any of the previous figures.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air intake system for an aircraft, the air intake system comprising:
   an air duct configured to provide airflow to an inside of an aircraft,
   an inlet arranged at one end of the air duct,
   a skin surrounding the inlet,
   a plurality of slots arranged on the skin,
   a driving means,
   a flap door connected to the driving means, and
   a plurality of fins connected to the driving means,
   wherein the driving means is configured for moving the flap door between at least two positions, said positions being a closed position wherein the flap door closes the inlet, and an opened position wherein the flap door is driven away from said closed position, and
   wherein the driving means is also configured to move the plurality of fins such that the plurality of fins protrudes through the slots.

2. The air intake system according to claim 1, further comprising
   a plurality of slots arranged on a surface of the air duct, and
   a plurality of fins connected to the driving means and configured to protrude towards inside the air duct through the plurality of slots arranged on the surface of the air duct.

3. The air intake system according to claim 1, further comprising a first hinge shaft connected to the flap door in one end of the first hinge shaft by a joint point, and a second hinge shaft connected to the plurality of fins in one end of the second hinge shaft by a joint point.

4. The air intake system according to claim 3, wherein the driving means comprises a first actuator and an articulating mechanism, the articulating mechanism being connected to the first and second hinge shaft such that the first and second hinge shafts are configured to be actuated conjointly by the first actuator.

5. The air intake system according to claim 4, wherein the articulating mechanism comprises a connecting rod articulately connected to the first and second hinge shafts in first and second joint points of the connecting rod, respectively.

6. The air intake system according to claim 5, wherein the first actuator is connected to the first hinge shaft.

7. The air intake system according to claim 5, wherein the first actuator is connected to the second hinge shaft.

8. The air intake system according to claim 3, wherein the driving means comprises a first actuator connected to the first hinge shaft and a second actuator connected to the second hinge shaft.

9. The air intake system according to claim 8, wherein the second actuator is at least one of an electrical actuator or a pneumatic actuator.

10. The air intake system according to claim 4, wherein the first actuator is at least one of an electrical or a pneumatic actuator.

11. The air intake system according to claim 1, wherein the flap door comprises a first and a second panel.

12. The air intake system according to claim 3,
   wherein the flap door comprises a first panel and a second panel, and
   wherein the first panel is connected to the first hinge shaft and the second panel is connected to the second hinge shaft.

13. The air intake system according to claim 11, wherein the first and the second panel are configured to be moved independently of each other.

14. The air intake system according to claim 1, wherein the driving means are configured to control an angle that forms upon the opened position of the flap door relative to the closed position of the flap door.

15. The air intake system according to claim 1, wherein the air duct provides air flow to an auxiliary power unit.

16. An aircraft comprising the air intake system according to claim 1.

* * * * *